(12) United States Patent
Zhao et al.

(10) Patent No.: US 10,848,440 B2
(45) Date of Patent: Nov. 24, 2020

(54) SYSTEMS AND METHODS FOR ALLOCATING BANDWIDTH ACROSS A CLUSTER OF ACCELERATORS

(71) Applicant: ALIBABA GROUP HOLDING LIMITED, Grand Cayman (KY)

(72) Inventors: Li Zhao, San Mateo, CA (US); Lingling Jin, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/359,700

(22) Filed: Mar. 20, 2019

(65) Prior Publication Data
US 2020/0304426 A1    Sep. 24, 2020

(51) Int. Cl.
*H04L 12/947* (2013.01)
*H04L 12/933* (2013.01)
*H04L 12/931* (2013.01)
*H04L 12/66* (2006.01)

(52) U.S. Cl.
CPC .............. *H04L 49/25* (2013.01); *H04L 12/66* (2013.01); *H04L 49/15* (2013.01); *H04L 49/354* (2013.01)

(58) Field of Classification Search
CPC ......... H04L 49/25; H04L 12/66; H04L 49/15; H04L 49/354
See application file for complete search history.

(56) References Cited

U.S. PATENT DOCUMENTS

2011/0314255 A1* 12/2011 Krishna ................. G06F 15/76
2015/0379670 A1* 12/2015 Koker ...................... G06T 1/20

* cited by examiner

*Primary Examiner* — Ronald B Abelson
(74) *Attorney, Agent, or Firm* — Finnegan, Henderson, Farabow, Garrett & Dunner, LLP

(57) ABSTRACT

The present disclosure provides methods and systems directed to providing quality of service to cluster of accelerators. The system can include a root connector; an interconnect switch communicatively coupled to the root connector over a plurality of lanes comprising a first set of lanes and a second set of lanes, wherein the first set of lanes are associated with a first virtual communication channel and a second set of lanes are associated with a second virtual communication channel; a first accelerator communicatively coupled to the interconnect switch and associated with a first traffic class identifier corresponding to first communication traffic communicated over the first set of lanes; and a plurality of accelerators communicatively coupled to the interconnect switch and associated with a second traffic class identifier that corresponds to second communication traffic having lower priority than the first communication traffic and that is communicated over the second set of lanes.

27 Claims, 7 Drawing Sheets

|        | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|--------|----|----|----|----|----|----|----|----|----|----|----|----|----|----|----|----|----|----|----|----|----|----|---|---|---|---|---|---|---|---|---|---|
| Byte 0 | R  | Fmt |   |   | Type |   |   |   | R | TC |   |   | R |   |   | TD | EP | Attr |   | R |   | Length |   |   |   |   |   |   |   |   |   |
| Byte 4 | Requester ID |  |  |  |  |  |  |  |  |  |  |  |  |  |  |  | Tag |  |  |  |  |  | Last BE |  |  |  | First BE |  |  |  |
| Byte 8 | Address |  |  |  |  |  |  |  |  |  |  |  |  |  |  |  |  |  |  |  |  |  |  |  |  |  |  |  |  |  | R |
| Byte 12 | Data |  |  |  |  |  |  |  |  |  |  |  |  |  |  |  |  |  |  |  |  |  |  |  |  |  |  |  |  |  |  |

FIG. 4

SYSTEMS AND METHODS FOR ALLOCATING BANDWIDTH ACROSS A CLUSTER OF ACCELERATORS

BACKGROUND

Computer systems use dedicated accelerators (can also be referred as co-processors) in collaboration with one or more general-purpose processors for many modern applications, including applications based on artificial intelligence ("AI"). Evolved from server architecture involving a single general-purpose processor and a single accelerator, servers comprising dual general-purpose processors and eight accelerators have become main stream. Some aggressive hardware vendors are pushing the limits further with an architecture involving dual general-purpose processors and sixteen accelerators and more in the future. Although the number of accelerators continue to increase, accelerators still communicate to other hardware resources via limited hardware interconnect buses and switches. Bandwidth of hardware interconnect buses, such as a peripheral component interconnect express ("PCIe") bus, has become a bottleneck for the overall performance of servers.

SUMMARY

Embodiments of the present disclosure provide a system including a root connector; an interconnect switch communicatively coupled to the root connector over a plurality of lanes comprising a first set of lanes and a second set of lanes, wherein the first set of lanes are associated with a first virtual communication channel and a second set of lanes are associated with a second virtual communication channel; a first accelerator communicatively coupled to the interconnect switch and associated with a first traffic class identifier corresponding to first communication traffic communicated over the first set of lanes; and a plurality of accelerators communicatively coupled to the interconnect switch and associated with a second traffic class identifier that corresponds to second communication traffic having lower priority than the first communication traffic and that is communicated over the second set of lanes.

Embodiments of the present disclosure also provide a method including establishing a first virtual communication channel over a first set of lanes between an interconnect switch and a root connector; establishing a second virtual communication channel over a second set of lanes between the interconnect switch and the root connector; acquiring first communication traffic associated with a first traffic class identifier over the first virtual communication channel; acquiring second communication traffic associated with a second traffic class identifier over the second virtual communication channel, wherein the second communication traffic have lower priority than the first communication traffic; routing the first communication traffic to a first accelerator associated with the first traffic class identifier; and routing the second communication traffic to one or more other accelerators associated with the second traffic class identifier.

Embodiments of the present disclosure also provide a non-transitory computer readable medium that stores a set of instructions that is executable by one or more processors of an apparatus to perform a method. The method includes establishing a first virtual communication channel over a first set of lanes between an interconnect switch and a root connector; establishing a second virtual communication channel over a second set of lanes between the interconnect switch and the root connector; acquiring first communication traffic associated with a first traffic class identifier over the first virtual communication channel; acquiring second communication traffic associated with a second traffic class identifier over the second virtual communication channel, wherein the second communication traffic have lower priority than the first communication traffic; routing the first communication traffic to a first accelerator associated with the first traffic class identifier; and routing the second communication traffic to one or more other accelerators associated with the second traffic class identifier.

BRIEF DESCRIPTION OF THE DRAWINGS

Embodiments and various aspects of the present disclosure are illustrated in the following detailed description and the accompanying figures. Various features shown in the figures are not drawn to scale.

FIG. 4 is a schematic diagram of an exemplary traffic layer comprising traffic class identifiers, according to some embodiments of the present disclosure.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Along with the rapid development and deployment of modern computer applications such as AI applications, computing capacity and computing speed play indispensable roles. As a result, a computer system executing AI applications generally uses dedicated accelerators (e.g., neural network processing units (NPUs), graphics processing units (GPUs), Field Programmable Gate Arrays (FPGAs)) to perform computations and spare system's main processor (e.g., central processing units (CPUs)) for other essential computations. GPUs are some of the most commonly used accelerators for AI applications. Due to the complex and taxing nature of AI computations, modern computer systems or servers comprise multiple accelerators to perform AI computations concurrently. Some vendors are pushing the limits with a server architecture having dual processors and sixteen accelerators.

It is common that a server with multiple accelerators perform many tasks concurrently. For example, a server with multiple accelerators can perform image recognition, voice recognition, and compression concurrently. Different applications can have different latency and throughput requirements. For example, applications involving image recognition are generally more latency sensitive than applications involving voice recognition to applications' users. As a result, image recognition requires more memory bandwidth to achieve a more sensitive latency requirement. In conventional systems, all accelerators are treated the same and provided with the same memory bandwidth. Latency sensitive applications, such as image recognition applications, need to compete with less latency sensitive applications for memory bandwidth since they share equal amount of resources in the interconnect switch and memory bandwidth.

Embodiments of the present disclosure provide a new system and method for providing quality of service (QoS) support on memory communication for accelerators. In this way, an accelerator processing higher priority applications can achieve better performance relative to accelerators processing less important applications.

Figure 1:
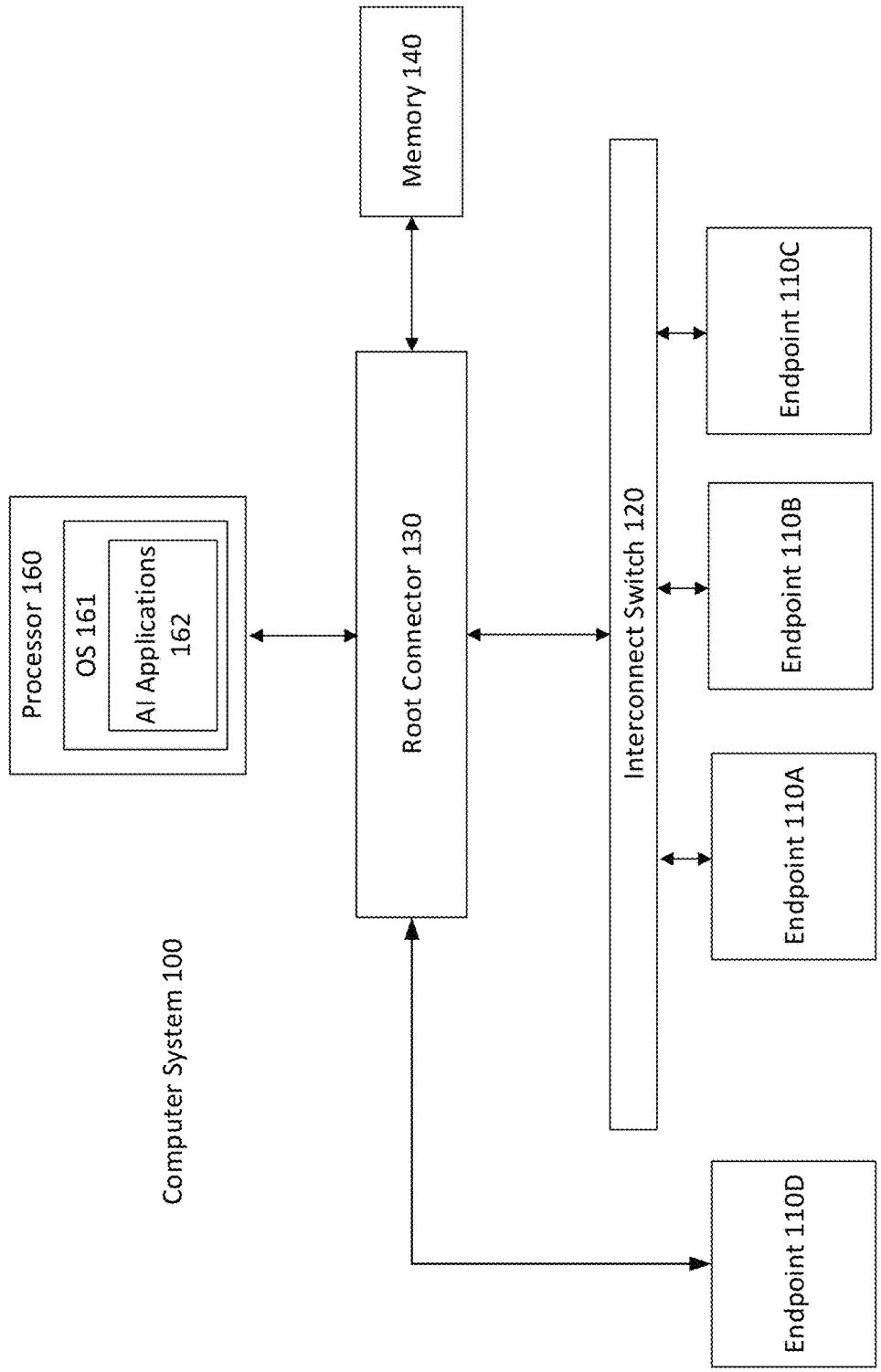
FIG. 1 is a schematic diagram of an exemplary computer system, consistent with embodiments of the present disclosure.

FIG. 1 is a schematic diagram of an exemplary computer system, consistent with embodiments of the present disclosure. As shown in FIG. 1, computer system 100 can include any combination of one or more endpoints 110A, 110B, 110C or 110D, at least one processor 160, at least one root connector 130, at least one memory 140, and at least one interconnect switch 120. In some embodiments, computer system 100 can be a server, a data center, a virtual server, a database, a mainframe computer, a computer, a personal computer, or any other types of computing systems. In some embodiments, computer system 100 can perform AI applications for users.

Computer system 100 can include an operating system 161 that can be stored in memory 140 and executed by processor 160. In some embodiments, processor 160 can be a CPU. Operating system 161 can control and manage data flow from and to each endpoint 110A-D through interconnect switch 120. Operating system 161 can include, among other things, one or more AI applications 162. In some embodiments, the operating system can be a kernel in a virtualization environment. Moreover, the virtualization environment can include a hypervisor that can be executed by processor 160 and can manage any number of virtual machines. The operating system can manage, or instruct processor 160 to manage, data flow from and to each endpoint through interconnect switch 120 or root connector 130.

Root connector 130 can be connected to processor 160 and interconnect switch 120. In some embodiments, root connector 130 can be a peripheral component interconnect express (PCIe) root complex. Root connector 130 can generate transactional requests on behalf of processor 160. In some embodiments, root connector 130 can be implemented as a discrete device, or integrated with processor 160. Endpoint 110D can be connected to root connector 130 directly. Memory access requests on memory 140 from endpoint 110A-D can be routed through root connector 130. In some embodiments, interconnect switch 120 can be a peripheral component interconnect express (PCIe) bus or a mesh network (e.g., NVLink).

Memory 140 can be connected to root connector 130 and can include any type of memory that can store data, programs, firmware, or executable instructions. Programs, firmware, or executable instructions stored in one or more memories 140 can be executed by one or more processors 160 of computer system 100. In some embodiments, memory 140 is accessible by one or more endpoints 110A, 110B, 110C and 110D via root connector 130 or interconnect switch 120.

Each endpoint 110A-D can be connected to interconnect switch 120 or root connector 130. Each endpoint 110A-C can be connected to interconnect switch 120 on a slot of interconnect switch 120. In some embodiments, a mapping between the slots of interconnect switch 120 and endpoints, including endpoint 110A, 110B and 110C can be maintained by operating system 161 of computer system or processor 160. Endpoints 110A-D can include one or more physical accelerators. In some embodiments, a physical accelerator can be a GPU, an NPU, a TPU, or any other processing unit that accelerates computation for a computer application, including an AI application.

Figure 2:
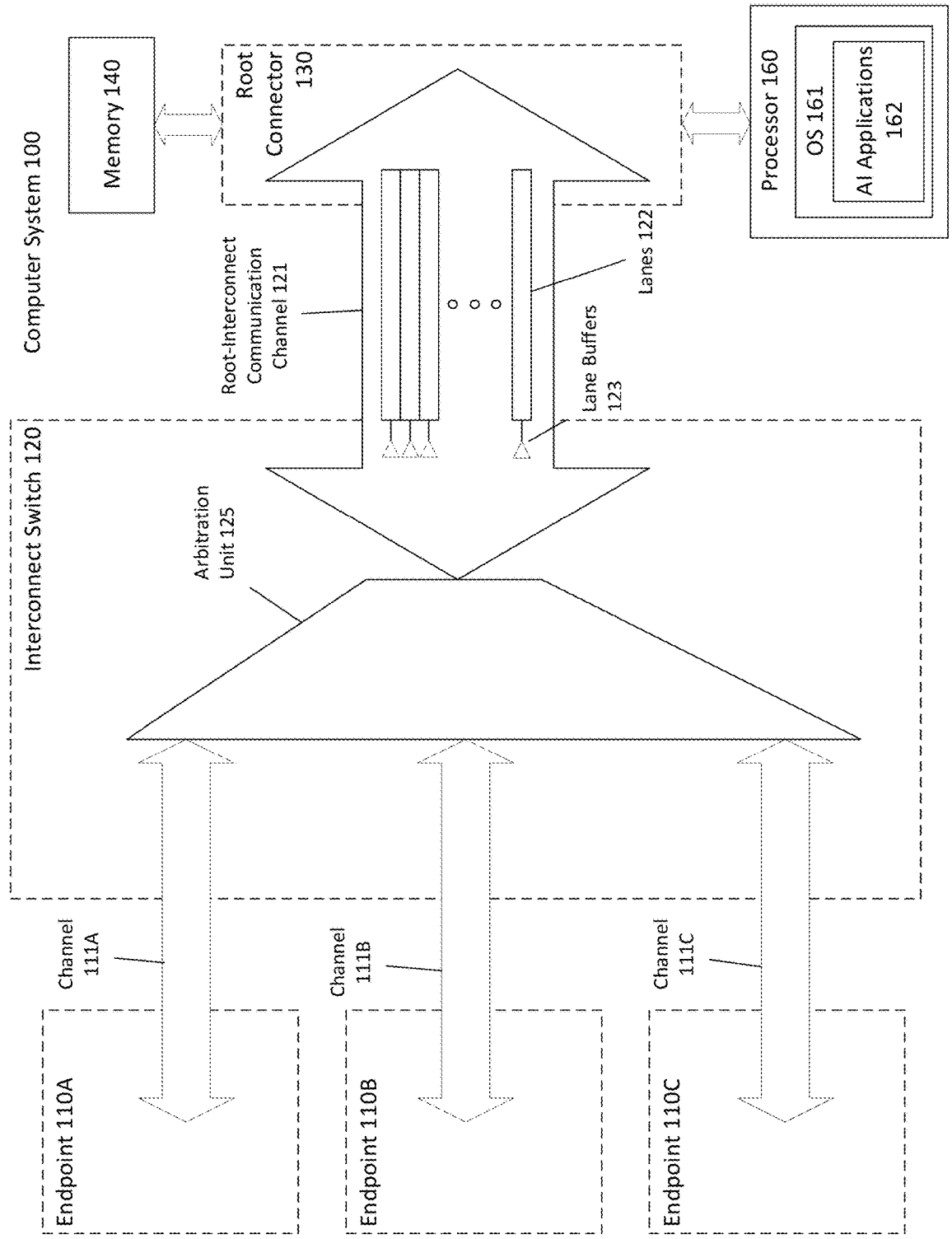
FIG. 2 is a schematic diagram of an exemplary communications between components of the computer system of FIG. 1, consistent with embodiments of the present disclosure.

While making memory access requests, endpoints 110A, 110B and 110C often compete for bandwidth between interconnect switch 120 and root connector 130. FIG. 2 is a schematic diagram of an exemplary communication between components of the computer system of FIG. 1, consistent with embodiments of the present disclosure. On the basis of FIG. 1, endpoint 110A-C of FIG. 2 sends memory access requests to memory 140 through channels 111A-C. Interconnect switch 120 receives communications from endpoints via channels 111A, 111B and 111C and forwards them to root connector 130 through a root-interconnect communication channel 121, which can include a number of lanes 122. Each lane 122 has a dedicated lane buffer 123. In some embodiments, the total number of lanes between interconnect switch 120 and root connector 130 can be, for example, 16, 32, or 64.

When the total amount of data transaction in channels 111A, 111B and 111C exceeds the total amount of data transactions allowed in root-interconnect communication channel 121, interconnect switch 120 arbitrates data transaction in channels 111A, 111B and 111C using an arbitration unit 125. By default, there are no quality of service involved and each of channels 111A, 111B and 111C is treated the same in terms of priority. For example, arbitration unit 125 may be implemented using round robin when contention occurs. Each channel 111A-C has an equal share of bandwidth in root-interconnect communication channel 121.

If each channel 111A-C has an equal priority, the default setting of arbitration in interconnect switch 120 would suffice. When running AI applications (e.g., AI applications 162), however, different applications can have different latency and throughput requirements. For example, applications directed to image recognition are generally more latency sensitive than voice-recognition applications. As a result, image recognition requires more memory bandwidth to achieve a more sensitive latency requirement. As shown in FIG. 2, if endpoint 110A is an accelerator running image-recognition operations and endpoints 110B and 110C are accelerators running voice-recognition operations, endpoint 110A would require more bandwidth in root-interconnect communication channel 121 in order to satisfy the more sensitive latency requirement to perform image-recognition operations.

Figure 3:
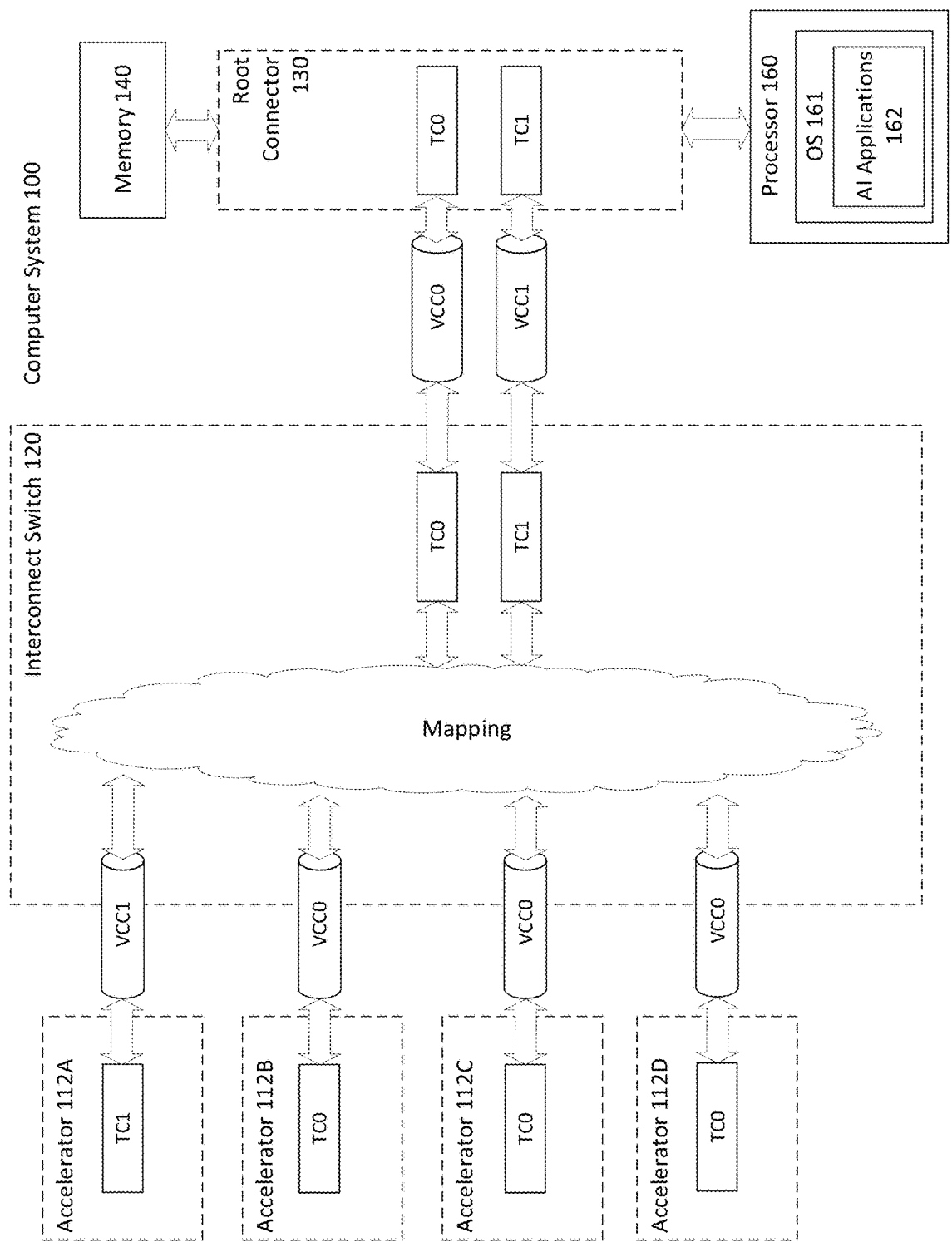
FIG. 3 is a schematic diagram of an exemplary interconnect using traffic class identifiers to achieve quality of service, according to some embodiments of the present disclosure.

Embodiments of the present disclosure provide a new system for providing quality of service support on memory communication for accelerators. FIG. 3 is a schematic diagram of an exemplary interconnect using traffic class identifiers to achieve quality of service, according to some embodiments of the present disclosure. On the basis of FIG. 2, computer system 100 of FIG. 3 comprises accelerators 112A, 112B, 112C, and 112D. In some embodiments, accelerators 112A-D can be endpoints 110A-C shown in FIG. 2. When accelerator 112A-D sends memory access requests to memory 140 via interconnect switch 120 and root connector 130, the memory access requests comprises a traffic class identifier. The traffic class identifier can comprise a plurality of traffic classes. For example, in some embodiments, the traffic class identifier comprises traffic class 0 (TC0) and traffic class 1 (TC1) information.

The traffic class identifier is used to identify a priority of a particular data packet travelling through the interconnect switch. Data packets travelling through the interconnect switch can be a part of the memory access requests or processing commands of AI applications. In some embodiments, an operating system (e.g., operating system 161 of FIG. 1) can assign, or instruct a processor (e.g., processor 160 of FIG. 1) to assign, traffic class identifiers to data packets.

In some embodiments, the traffic class identifier is embedded in a transactional layer of a data packet. FIG. 4 is a diagram of an exemplary transactional layer of a data packet where a traffic class identifier is embedded, according to some embodiments of the present disclosure. The data packet of FIG. 4 provides various types of information associated with the data packet, including format, type, requester information, length of data, etc. Traffic class identifier is located in the header of the data packet, particularly in bit 20-22 (TC) of the first four bytes. In some embodiments, interconnect switch 120 is a PCIe switch, and the data packet of FIG. 4 is a transaction layer packet (TLP). The data packet of FIG. 4 is a mere example of data packets used in some embodiments of the present disclosure, and the present disclosure is not limited to using the data packet shown in FIG. 4.

Referring back to FIG. 3, all communication traffic associated with memory access requests from accelerators is directed to multiple virtual communication channels. Virtual communication channels provide a means to support multiple independent logical data flows over a given common physical resources (e.g., channel bandwidth and lanes). In some embodiments, virtual communication channels can be PCIe virtual channels. Virtual communication channels used in computer system 100 of FIG. 3 can include virtual communication channel 0 (VCC0) and virtual communication channel 1 (VCC1). Each traffic class identifier is mapped to a particular virtual communication channel, and the data packet with the traffic class identifier embedded is directed to use that particular virtual communication channel when the data packet travels through interconnect switch 120. In some embodiments, the mapping between traffic class identifiers and virtual communication channels is set by an operating system (e.g., operating system 161) under instructions from an application (e.g., AI application 162). In some embodiments, the operating system sets the mapping by configuring interconnect switch 120 through a driver program of interconnect switch 120.

When performing AI applications 162, processor 160 can generate processing commands according to the operating system running AI applications and determine how many virtual communication channels are needed. For example, when executing AI applications involving image recognition and voice recognition, processor 160 determines that two virtual communication channels, VCC0 and VCC1, are needed to achieve quality of service. In addition, processor 160 can determine a priority for each processing command by assigning traffic class identifiers. For example, lower-priority processing commands (e.g., processing commands associated with voice recognition) are assigned with corresponding traffic class identifier TC0 and higher-priority processing commands (e.g. processing commands associated with image recognition) are assigned with corresponding traffic class identifier TC1.

Each accelerator 112A-D is configured to receive processing commands comprising a specific traffic class identifier and perform computations on the received processing commands. The number of accelerators configured to perform higher-priority processing commands is less than the number of accelerators configured to perform lower-priority processing commands. For example, accelerator 112A is configured to receive processing commands using traffic class identifier TC1, and accelerator 112B-D is configured to receive processing commands using traffic class identifier TC0. In addition, each accelerator 112A-D is configured to generate memory access requests using the same traffic class identifier in the received processing commands. For example, accelerator 112A is configured to generate memory access requests using traffic class identifier TC1, and accelerator 112B-D is configured to generate memory access requests using traffic class identifier TC0.

Interconnect switch 120 can be configured by processor operating system 161 to map memory access requests to virtual communication channels. For example, according to instructions from operating system 161, interconnect switch 120 maps memory access requests using traffic class identifier TC0 to virtual communication channel VCC0 and memory access requests using traffic class identifier TC1 to virtual communication channel VCC1. In addition, interconnect switch 120 can be configured to assign lanes (e.g., lanes 122 of FIG. 2) between interconnect switch 120 and root connector 130 to different virtual communication channels. For example, when 16 lanes are used to communicate between root connector 130 and interconnect switch 120, 8 lanes and their corresponding bandwidth can be allocated to virtual communication channel VCC1, while the other 8 lanes and their corresponding bandwidth can be allocated to virtual communication channel VCC0. That way, accelerator 112A processing operations having higher priority can have greater access to memory 140. In another example, where there are 32 lanes between interconnect switch 120 and root connector 130, 12 lanes can be allocated to virtual communication channel VCC0 and 20 lanes can be allocated to virtual communication channel VCC1.

The allocation of lanes to the virtual communication channels can be configurable and can be established by operating system 161, which can provide the configuration to interconnect switch 120. For example, if it is determined that virtual communication channel VCC0 needs more bandwidth, root connector 130 and interconnect switch 120 can be configured to allocate more lanes to virtual communication channel VCC0.

Computer system 100 of FIG. 3 provides a specific mapping topology using traffic class identifiers and virtual communication channels to achieve quality of service on the accelerators' memory access requests. As shown in FIG. 3, each accelerator 112A-D running processing commands of AI applications 162 is configured to receive processing commands of a specific traffic identifier. This ensures the uniformity of computations performed by each accelerator, which is important to AI applications. In addition, higher-priority processing commands are mapped to virtual communication channel VCC1, which has more assigned lanes and less assigned accelerators. In comparison, lower-priority processing commands can be mapped to virtual communication channel VCC0, which can serve as a default virtual communication channel and has less assigned lanes and more assigned accelerators. As a result, each accelerator running higher-priority processing commands (e.g., accelerator 112A) has less competing accelerators and more bandwidth resources when the accelerator makes memory access requests.

Figure 5:
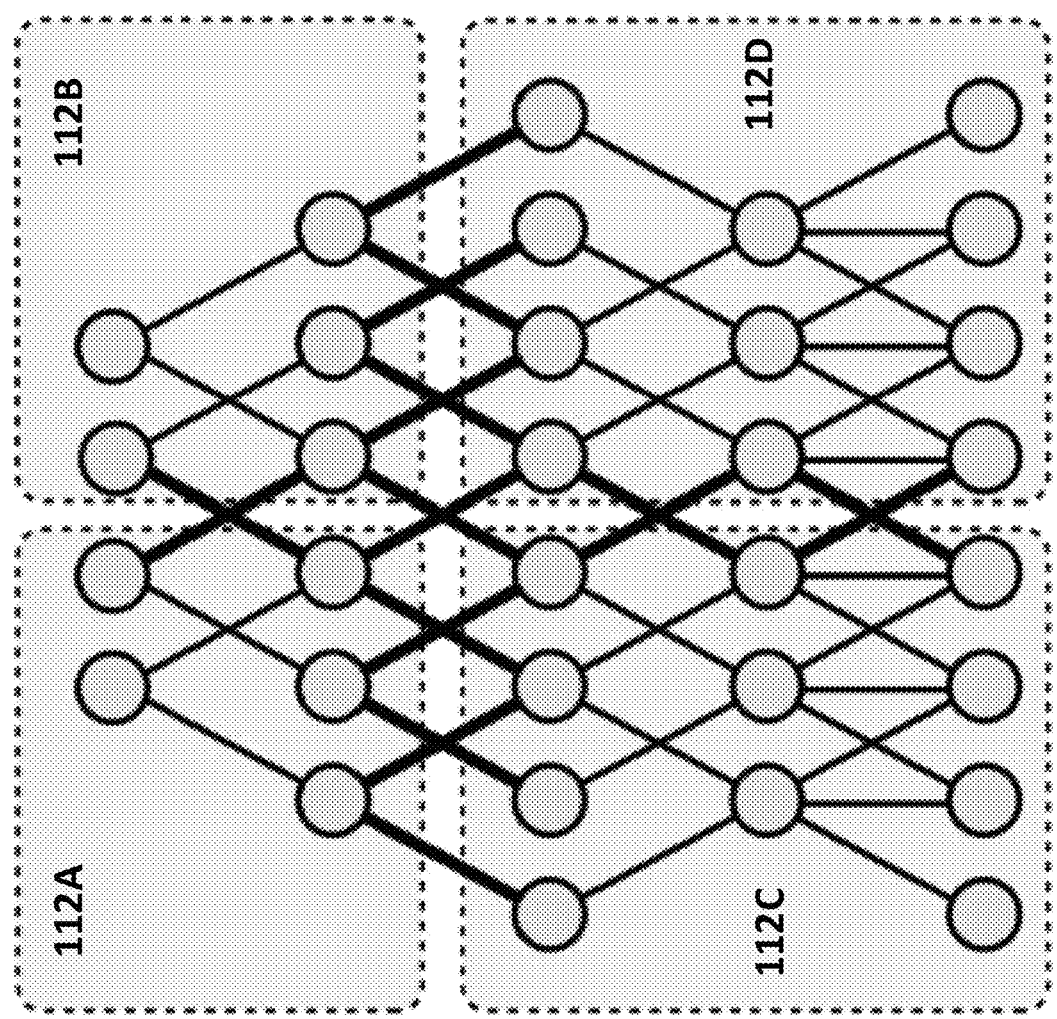
FIG. 5 is a schematic diagram of an exemplary model parallelism across multiple accelerators, according to some embodiments of the present disclosure.

In some embodiments, accelerators 112A-D may be configured to collaborate via model parallelism or data parallelism. For example, as shown in FIG. 5, a model parallelism can be performed. That is, the neural network model can be split among several accelerators (e.g., accelerators 112A-D) and use the same data for each model. Accordingly, each accelerator can work a part of the model. As a result, each accelerator can run workloads different from the other accelerators and require a different bandwidth based on that workload. For instance, it is appreciated that several different virtual communication channels (and corresponding traffic class identifiers) can be used and changed across the accelerators based on the workload needs.

Figure 6:
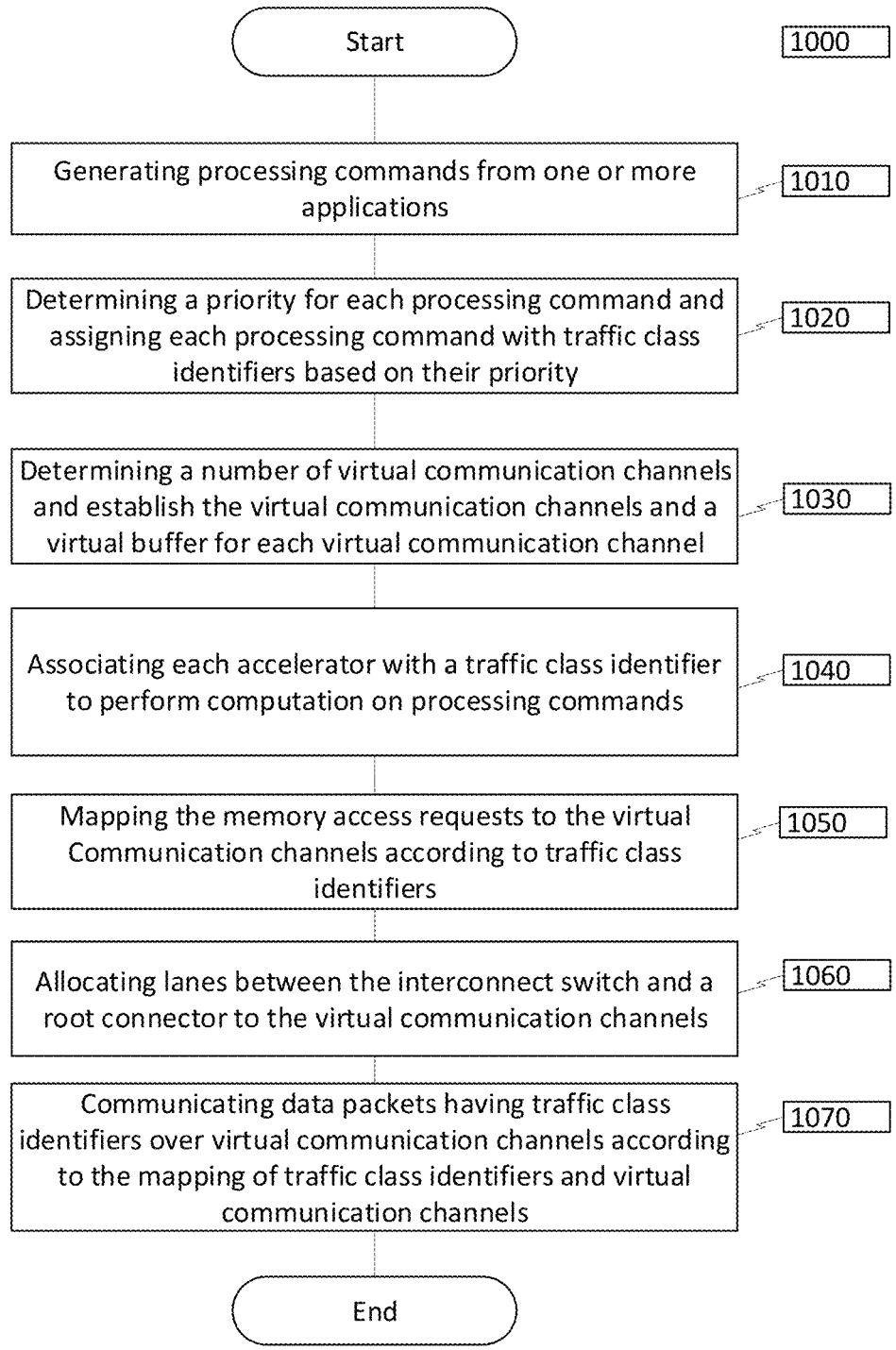
FIG. 6 is a flow diagram of an exemplary method using traffic class identifiers to achieve quality of service, according to some embodiments of the present disclosure.

Embodiments of the present disclosure further provide a method to implement quality of service for AI applications. FIG. 6 is a flow diagram of an exemplary method using traffic class identifiers to achieve quality of service, according to some embodiments of the present disclosure. It is appreciated that method 1000 of FIG. 6 can be performed by an operating system in a computer system (e.g., operating system 161 in computer system 100 of FIG. 1-3) or a processor running the operating system (e.g., processor 160 running operating system 161 of FIG. 1-3).

In step 1010, processing commands are generated from one or more AI applications (e.g., AI applications 162). The processing commands are generated to be sent to a plurality of accelerators for computation. For example, as shown in FIG. 3, operating system 161 generates processing commands from AI applications 162 that are to be sent to accelerator 112A-D for computation.

In step 1020, a priority for each processing command is determined and processing commands are assigned with traffic class identifiers based on their priority. For example, as shown in FIG. 3, operating system 161 determines which processing commands receive a higher priority in data traffic. Those processing commands with a higher priority in data traffic are assigned a traffic class identifier 1 (e.g., traffic class identifier TC1 of FIG. 3), and those processing commands with a lower priority in data traffic are assigned a traffic class identifier 0 (e.g., traffic class identifier TC0 of FIG. 3). In some embodiments, the operating system determines priority of each processing command under the instructions of the AI applications. For example, as shown in FIG. 3, AI applications 162 instructs operating system 161 to assign traffic class identifier TC1 to certain higher-priority processing commands and traffic class identifier TC0 to certain lower-priority processing commands. It is appreciated that more than two traffic class identifiers can be used based on the configuration of the system.

In step 1030, a number of virtual communication channels is determined and the virtual communication channels and their virtual buffers are established according to the AI applications. The number of virtual communication channels can be based on the number of different traffic classes that are used. In some embodiments, victual communication channels can be PCIe virtual channels. In this example, since two different traffic classes are used, the operating system can establish two virtual communication channels, which comprises virtual communication channel 0 and virtual communication channel 1. For example, as shown in FIG. 3, operating system 161 determines that running AI applications 162 require two virtual communication channels. Operating system 161 establishes virtual communication channels VCC0 and VCC1. In addition, operating system 161 establishes virtual buffers for virtual communication channels VCC0 and VCC1 (e.g., a buffer for each channel). In some embodiments, the operating system establishes the virtual communication channels and their virtual buffers by configuring an interconnect switch through the interconnect's driver program. For example, according to FIG. 3, operating system 161 can configure interconnect switch 120 through interconnect switch 120's driver program to establish virtual communication channels VCC0 and VCC1 and their virtual buffers.

In step 1040, each accelerator is associated with a traffic class identifier to perform computation on processing commands. In some embodiments, the operating system can assign less accelerators to perform higher-priority processing commands. Each accelerator may generate memory access requests to a memory connected to a root connector (e.g., a PCIe root complex) using the same traffic class identifier in the processing commands. For example, as shown in FIG. 3, operating system 161 assigns accelerator 112A to perform computation on processing commands associated with traffic class identifier TC1, and accelerators 112B-D to perform computations on processing commands associated with traffic class identifier TC0. Accelerator 112A can generate memory access requests having traffic class identifier TC1 in the header data (e.g., header data of data packet of FIG. 4), and accelerator 112B-D can generate memory access requests having traffic class identifier TC0 in the header data (e.g., header data of data packet of FIG. 4). In some embodiments, the operating system configures each accelerator according to instructions from the AI applications. For example, as shown in FIG. 3, instructions from AI applications 162 comprises assigning accelerator 112 A to traffic class identifier TC1 and accelerator 112B-D to traffic class identifier TC0. In some embodiments, operating system 161 configures each accelerator through accelerator's driver programs. It is appreciated that some accelerators may be idle and may not be associated with a traffic class identifier.

In step 1050, memory access requests are mapped to the virtual communication channels according to traffic class identifiers. Memory access requests comprising traffic class identifier 0 are mapped to virtual communication channel 0, and memory access requests comprising traffic class identifier 1 are mapped to virtual communication channel 1. In some embodiments, the mapping is performed by the operating system configuring the interconnect switch through the interconnect switch's driver program. For example, operating system 161 of FIG. 3 can configure interconnect switch 120 through interconnect switch 120's driver program to map memory access requests having traffic class identifier TC0 to virtual communication channel VCC0, and memory access requests having traffic class identifier TC1 to virtual communication channel VCC1. In some embodiments, the mapping is performed by the operating system that follows instructions of the AI programs.

In step 1060, lanes between the interconnect switch and a root connector are allocated to the virtual communication channels. In some embodiments, the operating system can allocate more lanes to virtual communication channel 1 when compared to virtual communication channel 0, as virtual communication channel 1 carries higher priority traffic. In some embodiments, the operating system assigns lanes by configuring the interconnect switch through the interconnect switch's driver program. For example, when 32 lanes are used, operating system 161 of FIG. 3 can assigns 20 lanes to virtual communication channel 1 and 12 lanes to virtual communication channel 0 by configuring interconnect switch 120 through interconnect switch 120's driver program. Accordingly, more available bandwidth is allocated for virtual communication channel 1, which is associated with higher priority traffic having the traffic class identifier TC1.

In step 1070, data packets having traffic class identifiers are communicated over virtual communication channels according to the mapping of traffic class identifiers and virtual communication channels. For example, as shown in FIG. 3, memory access requests from accelerator 112A are forwarded to memory 140 using virtual communication channel 1, and memory access requests from accelerator 112B-D are forwarded to memory 140 using virtual communication channel 0.

Method 1000 provides a specific mapping topology using traffic class identifiers and virtual communication channels to achieve quality of service on the accelerators' memory access requests. According to method 1000, each accelerator running processing commands of AI applications is configured to receive processing commands of a specific traffic identifier. This ensures the uniformity of computations performed by each accelerator, which is important to AI applications. In addition, higher-priority processing commands is mapped to a virtual communication channel that has more assigned lanes and less assigned accelerators. As a result, each accelerator running higher-priority processing commands has less competing accelerators and more bandwidth resource when the accelerator makes memory access requests.

Figure 7:
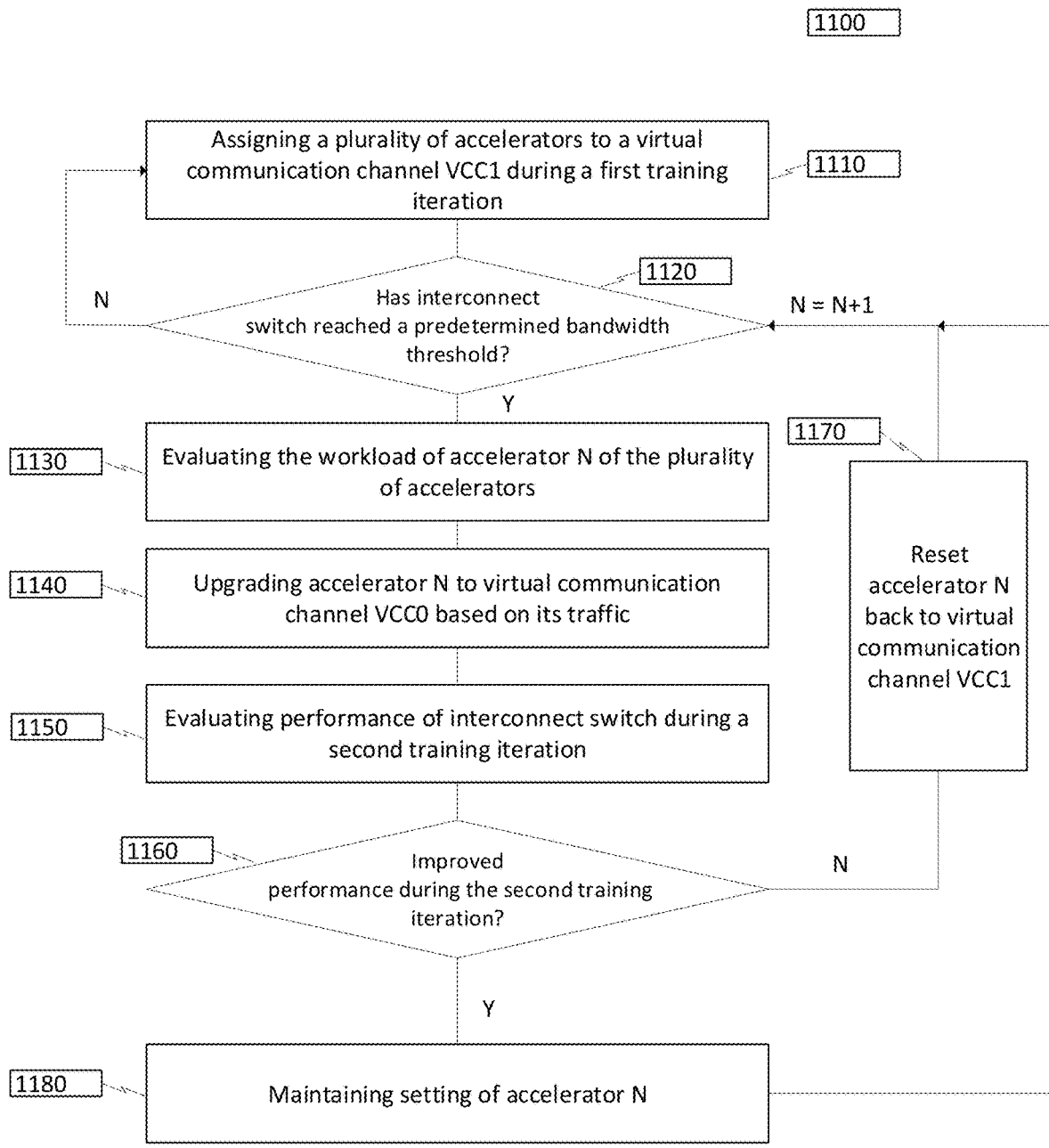
FIG. 7 is a flow diagram of an exemplary method for dynamically updating the bandwidth allocation for accelerators, according to some embodiments of the present disclosure.

FIG. 7 is a flow diagram of an exemplary method 1100 for dynamically updating the bandwidth allocation for accelerators, according to some embodiments of the present disclosure. Method 1100 can be performed by an interconnect switch (e.g., interconnect switch 120). In some embodiments, virtual communication channel settings can be accomplished using software, either by user application or by a driver program of the interconnect switch. It is appreciated that method 1100 can be used over one or more training sessions to maximize the training performance. In some embodiments, virtual communication channels of method 1110 can be PCIe virtual channels.

In step 1110, the interconnect switch can assign a plurality of accelerators (e.g., accelerators 112A-D) to a virtual communication channel VCC1 during a first training iteration. At this point, each of the plurality of accelerators have the ability to utilize the same bandwidth through the interconnect switch and a root connector (e.g., root connector 130). As indicated above, virtual communication channel VCC1 may transport traffic having a lower priority than traffic transported over a virtual communication channel VCC0. In some embodiments, the assignment of an accelerator to the virtual communication channel can be performed in combination with a root connector, or using software, either by user application or by driver programs of the interconnect switch.

In step 1120, the interconnect switch determines whether it has reached a predetermined bandwidth threshold. The predetermined bandwidth threshold is configurable and can be modified. For example, the threshold may be 80% of peak performance. If that threshold is not met, method can proceed back to step 1110.

On the other hand, if the predetermined bandwidth threshold is met, the interconnect switch can evaluate the workload traffic of accelerator N of the plurality of accelerators. If the traffic of accelerator N exceeds a threshold (which can be based on the percentage of all traffic through the interconnect switch), at step 1140, the interconnect switch can upgrade accelerator N to virtual communication channel VCC0. The upgrade can be performed in conjunction with the root connector.

At step 1150, the interconnect switch can evaluate its performance during the second training iteration to determine (at step 1160) whether the interconnect switch performed better during the second training iteration when compared to the first training iteration. If an improvement does not occur, at step 1170, the interconnect switch resets accelerator N back to virtual communication channel VCC1 and the next accelerator N+1 of the plurality of accelerators is evaluated to the extent that the predetermined bandwidth threshold has still been met.

On the other hand, if an improvement does occur, at step 1180, the setting of accelerator N is maintained (i.e., accelerator N is assisted to VCC0) and the next accelerator N+1 of the plurality of accelerators is evaluated to the extent that the predetermined bandwidth threshold has still been met.

Although AI applications are used as examples to demonstrate computer system 100 and methods 1000 and 1100, computer system 100 and methods 1000 and 1100 are not limited to running and managing AI applications. Processor 160 in computer system 100 can perform any type of application and transmit data from the application to any of the accelerators 112A-D. Operating system 161 of computer system 100 can configure accelerators 112A-D and interconnect switch 120 through their driver programs, regardless of what type of applications processor 160 is performing.

The various example embodiments described herein are described in the general context of method steps or processes, which may be implemented in one aspect by a computer program product, embodied in a computer-readable medium, including computer-executable instructions, such as program code, executed by computers in networked environments. In some embodiments, the operating system (e.g., operating system 161) may instruct components (such as a root connector or interconnect switch) of computer system (e.g., computer system 100) to perform various functions described above, such as establishing the priority of AI applications, establishing the traffic classes and virtual communication channels, mapping the traffic classes to the virtual communication channels, and allocating lanes. The computer system may comprise a storage that is a storage medium such as a hard disk, random access memory (RAM), other types of computer readable memory, and the like. The storage may include a non-transitory computer readable medium that stores instructions for computer system and operating system to perform. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

In some embodiments, the storage can store program modules. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. A computer system, comprising:
   a root connector, configured to connect to a memory;
   an interconnect switch communicatively coupled to the root connector over a plurality of lanes comprising a first set of lanes and a second set of lanes, wherein the first set of lanes are associated with a first virtual communication channel and a second set of lanes are associated with a second virtual communication channel;
   a first accelerator communicatively coupled to the interconnect switch and associated with a first traffic class identifier corresponding to first communication traffic communicated over the first set of lanes; and
   a plurality of accelerators communicatively coupled to the interconnect switch and associated with a second traffic class identifier that corresponds to second communication traffic having lower priority than the first communication traffic and that is communicated over the second set of lanes, wherein the first communication traffic and the second communication traffic comprising processing commands and memory access requests.

2. The system according to claim 1, wherein the first set of lanes includes more lanes than the second set of lanes.

3. The system according to claim 1, wherein the first communication traffic further comprises processing commands related to image recognition and the second communication traffic further comprising processing commands related to voice recognition.

4. The system according to claim 1, wherein the interconnect switch is a peripheral component interconnect express (PCIe) switch, the root connector is a PCIe root complex, and the traffic class identifier is in a transaction layer packet (TLP).

5. The system according to claim 1, wherein the interconnect switch is a mesh network.

6. The system according to claim 1, further comprising one or more other accelerators communicatively coupled to the interconnect switch and associated with the first traffic class identifier.

7. The system according to claim 1, wherein the root connector includes a mapping configuration associating the first traffic class identifier with the first virtual communication channel and the second traffic class identifier with the second virtual communication channel.

8. A computer system, comprising:
   a root connector, configured to connect to a memory;
   an interconnect switch communicatively coupled to the root connector over a plurality of lanes comprising a first set of lanes and a second set of lanes, wherein the first set of lanes are associated with the first virtual communication channel and a second set of lanes are associated with a second virtual communication channel;
   a first accelerator communicatively coupled to the interconnect switch and associated with a first traffic class identifier corresponding to first communication traffic communicated over the first set of lanes;
   a plurality of accelerators communicatively coupled to the interconnect switch and associated with a second traffic class identifier that corresponds to second communication traffic having lower priority than the first communication traffic and that is communicated over the second set of lanes; and
   a processor communicatively coupled to the root connector and configured to generate processing commands associated with the first communication traffic and the second communication traffic.

9. A method comprising:
   establishing a first virtual communication channel over a first set of lanes between an interconnect switch and a root connector;
   establishing a second virtual communication channel over a second set of lanes between the interconnect switch and the root connector;
   acquiring first communication traffic associated with a first traffic class identifier over the first virtual communication channel;
   acquiring second communication traffic associated with a second traffic class identifier over the second virtual communication channel, wherein the second communication traffic have lower priority than the first communication traffic, the first communication traffic and the second communication traffic are based on processing commands, and the processing commands include higher priority processing commands assigned with the first traffic class identifier and lower priority commands assigned with the second traffic class identifier;
   routing the first communication traffic to a first accelerator associated with the first traffic class identifier; and
   routing the second communication traffic to one or more other accelerators associated with the second traffic class identifier.

10. The method according to claim 9, wherein the first communication traffic and the second communication traffic are based on processing commands generated according to artificial intelligence applications.

11. The method according to claim 9, further comprising establishing a virtual buffer for each virtual communication channel.

12. The method according to claim 9, further comprising:
prior to establishing the first virtual communication channel and the second virtual communication channel, allocating lanes between the interconnect switch and the root connector to virtual communication channels, wherein the allocated lanes include the first set of lanes allocated to the first virtual communication channel and the second set of lanes allocated to the second virtual communication channel.

13. The method according to claim 9, wherein the first traffic class identifier is mapped to the first virtual communication channel and the second traffic class identifier is mapped to the second virtual communication channel.

14. The method according to claim 9, further comprising associating each accelerator of a plurality of accelerators communicating with the interconnect switch with a traffic class identifier.

15. The method according to claim 9, further comprising mapping memory access requests of the first accelerator associated with the first traffic class identifier to a first virtual communication channel and mapping memory access requests of an accelerator of the one or more accelerators associated with the second traffic class identifier to a second virtual communication channel.

16. A method comprising:
assigning a plurality of accelerators to a first virtual communication channel of an interconnect switch;
determining if the interconnect switch has met a predetermined bandwidth threshold;
evaluating a workload traffic of a first accelerator of the plurality of accelerators in response to a determination that the interconnect switch has reached the predetermined bandwidth threshold;
assigning the first accelerator a second virtual communication channel in response to the evaluation, wherein the second virtual communication channel transports traffic having a higher priority than traffic transported over the first virtual communication channel;
determining whether the interconnect switch has achieved a better performance based on the assignment of the first accelerator to the second virtual communication channel; and
configuring the interconnect switch based on the determination.

17. The method according to claim 16, wherein the threshold is based on a percentage of all traffic through the interconnect switch.

18. The method according to claim 16, wherein configuring the interconnect switch based on the determination further comprises:
assigning the first accelerator to the first virtual communication channel in response to the determination that the interconnect switch does not have a better performance after the assignment of the first accelerator to the second virtual communication channel.

19. The method according to claim 16, wherein configuring the interconnect switch based on the determination further comprises:
maintaining the assignment of the first accelerator to the second virtual communication channel in response to the determination that the interconnect switch has a better performance.

20. The method according to claim 16, wherein configuring the interconnect switch based on the determination further comprises:
evaluating a workload traffic of a second accelerator of the plurality of accelerators to the extent that the interconnect switch has met the predetermined bandwidth threshold after the assignment of the first accelerator to the second virtual communication channel.

21. A non-transitory computer readable medium that stores a set of instructions that is executable by one or more processors of an apparatus to perform a method comprising:
establishing a first virtual communication channel over a first set of lanes between an interconnect switch and a root connector;
establishing a second virtual communication channel over a second set of lanes between the interconnect switch and the root connector;
acquiring first communication traffic associated with a first traffic class identifier over the first virtual communication channel;
acquiring second communication traffic associated with a second traffic class identifier over the second virtual communication channel, wherein the second communication traffic have lower priority than the first communication traffic, the first communication traffic and the second communication traffic are based on processing commands, and the processing commands include higher priority processing commands assigned with the first traffic class identifier and lower priority commands assigned with the second traffic class identifier;
route the first communication traffic to a first accelerator associated with the first traffic class identifier; and
route the second communication traffic to one or more other accelerators associated with the second traffic class identifier.

22. The non-transitory computer readable medium according to claim 21, wherein the first communication traffic and the second communication traffic are based on processing commands generated according to artificial intelligence applications.

23. The non-transitory computer readable medium according to claim 21, wherein the set of instructions that is executable by one or more processors of the apparatus to further perform:
establishing a virtual buffer for each virtual communication channel.

24. The non-transitory computer readable medium according to claim 21, wherein the set of instructions that is executable by one or more processors of the apparatus to further perform:
prior to establishing the first virtual communication channel and the second virtual communication channel, allocating lanes between the interconnect switch and the root connector to virtual communication channels, wherein the allocated lanes include the first set of lanes allocated to the first virtual communication channel and the second set of lanes allocated to the second virtual communication channel.

25. The non-transitory computer readable medium according to claim 21, wherein the first traffic class identifier is mapped to the first virtual communication channel and the second traffic class identifier is mapped to the second virtual communication channel.

26. The non-transitory computer readable medium according to claim 21, wherein the set of instructions that is executable by one or more processors of the apparatus to further perform: associating each accelerator of a plurality of accelerators communicating with the interconnect switch with a traffic class identifier.

27. The non-transitory computer readable medium according to claim 21, wherein the set of instructions that is executable by one or more processors of the apparatus to further perform: mapping memory access requests of the first accelerator associated with the first traffic class identifier to a first virtual communication channel and mapping memory access requests of an accelerator of the one or more accelerators associated with the second traffic class identifier to a second virtual communication channel.

\* \* \* \* \*